United States Patent [19]
Ishihara et al.

[11] Patent Number: 5,823,286
[45] Date of Patent: Oct. 20, 1998

[54] SUPPORTING STRUCTURE FOR EXHAUST PIPE SYSTEM OF A VEHICLE

[75] Inventors: Satoshi Ishihara; Yukishige Kuwabara, both of Saitama, Japan

[73] Assignee: Honda Giken Kogyo Kabushiki Kaisha, Tokyo, Japan

[21] Appl. No.: 463,233

[22] Filed: Jun. 5, 1995

[30] Foreign Application Priority Data

Jun. 14, 1994 [JP] Japan ................................ 6-131822

[51] Int. Cl.⁶ ............................................. B60K 13/04
[52] U.S. Cl. ..................................... 180/309; 180/225
[58] Field of Search ............................. 180/309, 219, 180/225, 228, 89.2

[56] References Cited

U.S. PATENT DOCUMENTS

| | | | |
|---|---|---|---|
| 4,114,715 | 9/1978 | Theron | 180/309 |
| 4,339,919 | 7/1982 | Jobling | 180/309 |
| 5,127,489 | 7/1992 | Takato et al. | 180/309 |

FOREIGN PATENT DOCUMENTS

| | | | |
|---|---|---|---|
| 314278 | 3/1974 | Austria . | |
| 2637014 | 3/1990 | Germany . | |
| 0289428 | 12/1978 | Japan | 180/309 |
| 0071627 | 6/1981 | Japan | 180/309 |
| 0089424 | 5/1983 | Japan | 180/309 |
| 0059525 | 4/1984 | Japan | 180/309 |
| 0082437 | 5/1985 | Japan | 180/309 |
| 297184 | 8/1990 | Japan . | |

OTHER PUBLICATIONS

Patent Abstracts of Japan, vol. 12, No. 212 (M–710), Jun. 17, 1988 and JP 63–016120A, Jan. 23, 1988.

Patent Abstracts of Japan, vol. 17, No. 106 (M–1375), Mar. 4, 1993 and JP 4–295124A, Oct. 20, 1992.

Primary Examiner—Anne Marie Boehler
Attorney, Agent, or Firm—Birch, Stewart, Kolasch & Birch, LLP

[57] ABSTRACT

A pair of hanger bolts for supporting mounting bosses of a power unit including an engine are mounted on a body frame by way of resilient support members. A pair of front mounting arms of an exhaust pipe and a muffler are fixed to the hanger bolts so that vibrations of the exhaust pipe are absorbed together with vibrations of the engine by the common resilient support members.

19 Claims, 7 Drawing Sheets

SUPPORTING STRUCTURE FOR EXHAUST PIPE SYSTEM OF A VEHICLE

BACKGROUND OF THE INVENTION

1. Field of the Invention

A supporting structure for an exhaust pipe system of a vehicle is provided wherein a supporting structure for an exhaust pipe system includes an exhaust pipe extending from an engine and a muffler connected to a rear end of the exhaust pipe. A power unit including the engine and a transmission is supported on a body frame by way of a resilient support member.

2. Description of Background Art

In a conventional motorcycle, a power unit is supported on a body frame by way of a resilient support member while an exhaust pipe system of an engine is mounted on the body frame by way of a resilient support member for exclusive use of the exhaust pipe system so that vibrations transmitted from the engine to the exhaust pipe system may be prevented from being transmitted to the body frame as shown in Japanese Utility Model Laid-open No. Hei 2-97184.

In such a supporting structure for an exhaust pipe system as described above, since a resilient support member for exclusive use by the exhaust pipe system is required, an increase in cost cannot be avoided. Bending stress sometimes acts upon the exhaust pipe system from a difference in vibration absorption characteristic between a resilient support member for a power unit and the resilient support member for the exhaust pipe system.

SUMMARY AND OBJECTS OF THE INVENTION

The present invention has been made in view of such a circumstance as described above, and it is an object of the present invention to provide an inexpensive supporting structure which can support an exhaust pipe system while effectively suppressing transmission of vibrations from the exhaust pipe system to a body frame.

In order to attain the object described above, according to the present invention, a supporting structure for an exhaust pipe system of a vehicle is herein disclosed wherein a power unit having an engine and a transmission is supported on a body frame by way of a resilient support member, and an exhaust pipe system extending from the engine is supported on a bracket fixed to the power unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENTS OF THE INVENTION

The following embodiments of the present invention will be described with reference to the drawings.

Figure 1:
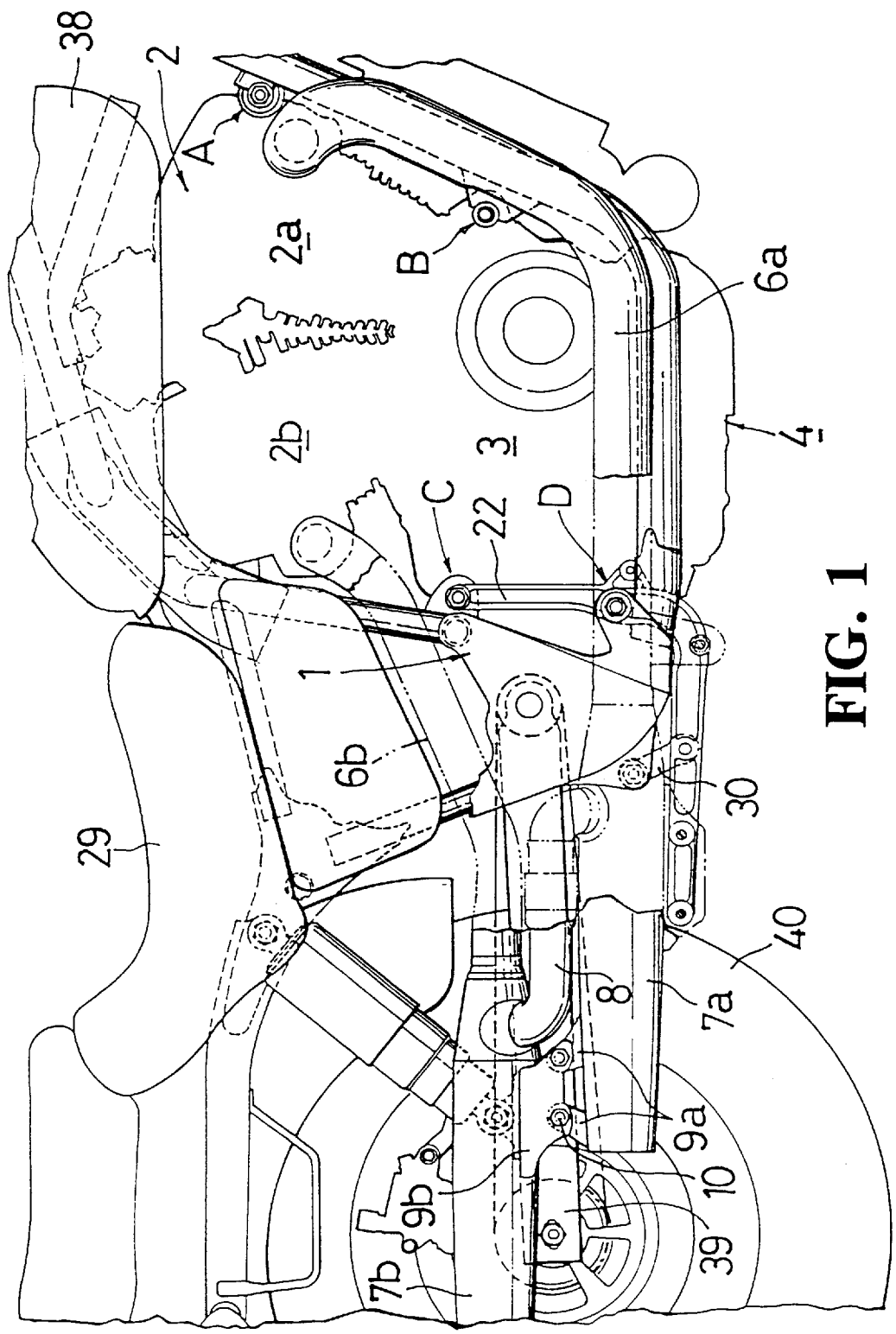
FIG. 1 is a side elevational view of a motorcycle showing a first embodiment of the present invention.

A first embodiment as shown in FIGS. 1 to 5 will be described. Referring to FIG. 1, a power unit 4 includes an engine 2 and a transmission 3 formed as a unit and supported at two front locations A and B and two rear locations C and D on an body frame 1 of a motorcycle by way of resilient support members 5 which will be hereinafter described.

The engine 2 is constructed in a V-shaped configuration having a front bank 2a and a rear bank 2b, and an exhaust pipe 6a of the front bank 2a extends downwardly in a bent condition from a front face of the front bank 2a and then is bent rearwardly such that it passes in the proximity of a bottom portion of the power unit 4, and then a muffler 7a is connected to the exhaust pipe 6a rearwardly of the power unit 4. Meanwhile, an exhaust pipe 6b of the rear bank 2b extends rearwardly downwardly from a rear face of the rear bank 2b, and a muffler 7b is connected to the exhaust pipe 6b rearwardly of a rear end of the exhaust pipe 6a of the front bank 2a. The two mufflers 7a and 7b are interconnected, at portions in the proximity of entrances thereof, with each other by way of a connection pipe 8. Connection pieces 9a and 9b each project from an outer face of the mufflers 7a and 7b, respectively, and are coupled to each other by means of bolts 10. In the foregoing, the exhaust pipes 6a and 6b and the mufflers 7a and 7b constitute an exhaust pipe system of the engine 2.

Figure 2:
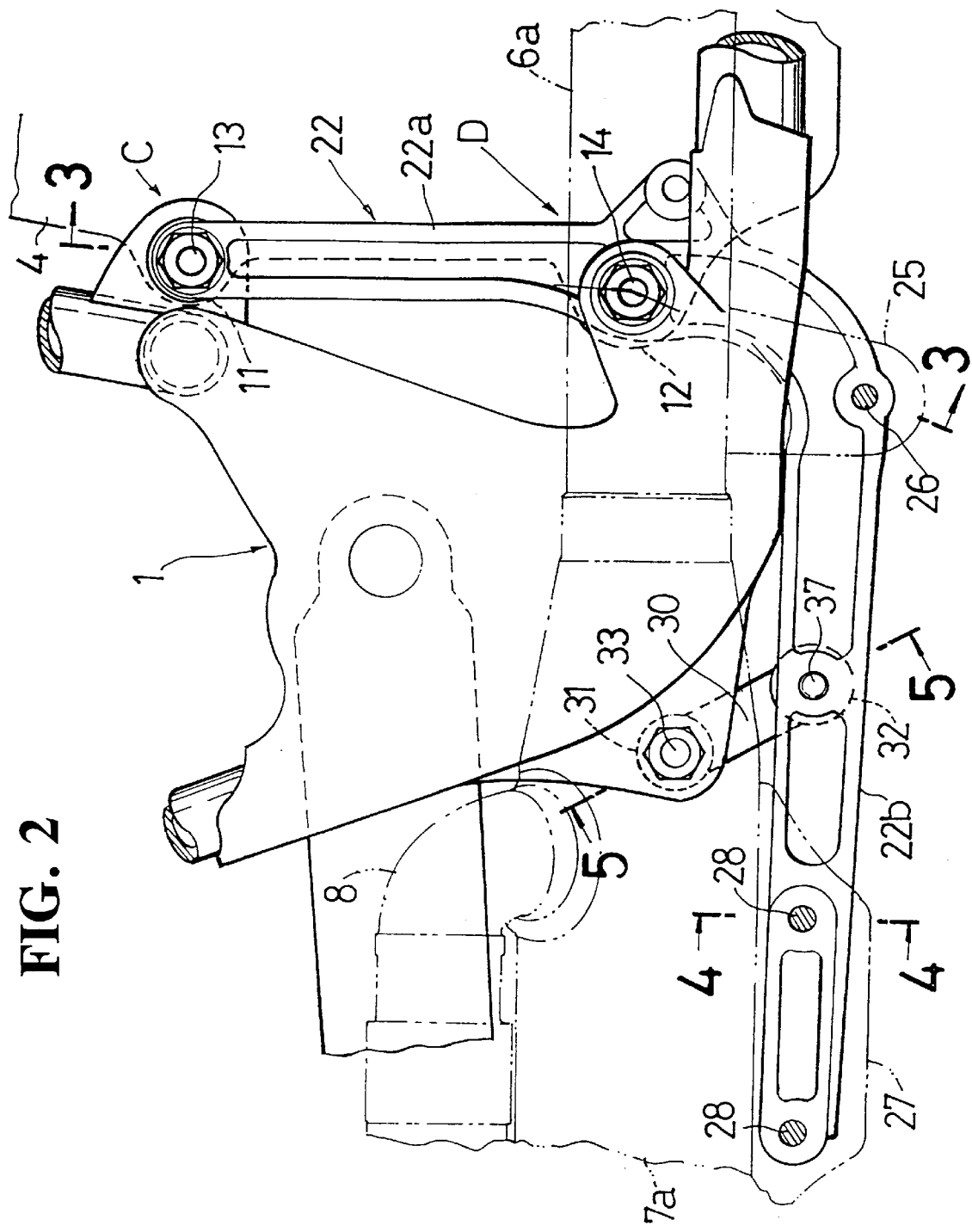
FIG. 2 is an enlarged side elevational view of essential part of FIG. 1.
Figure 3:
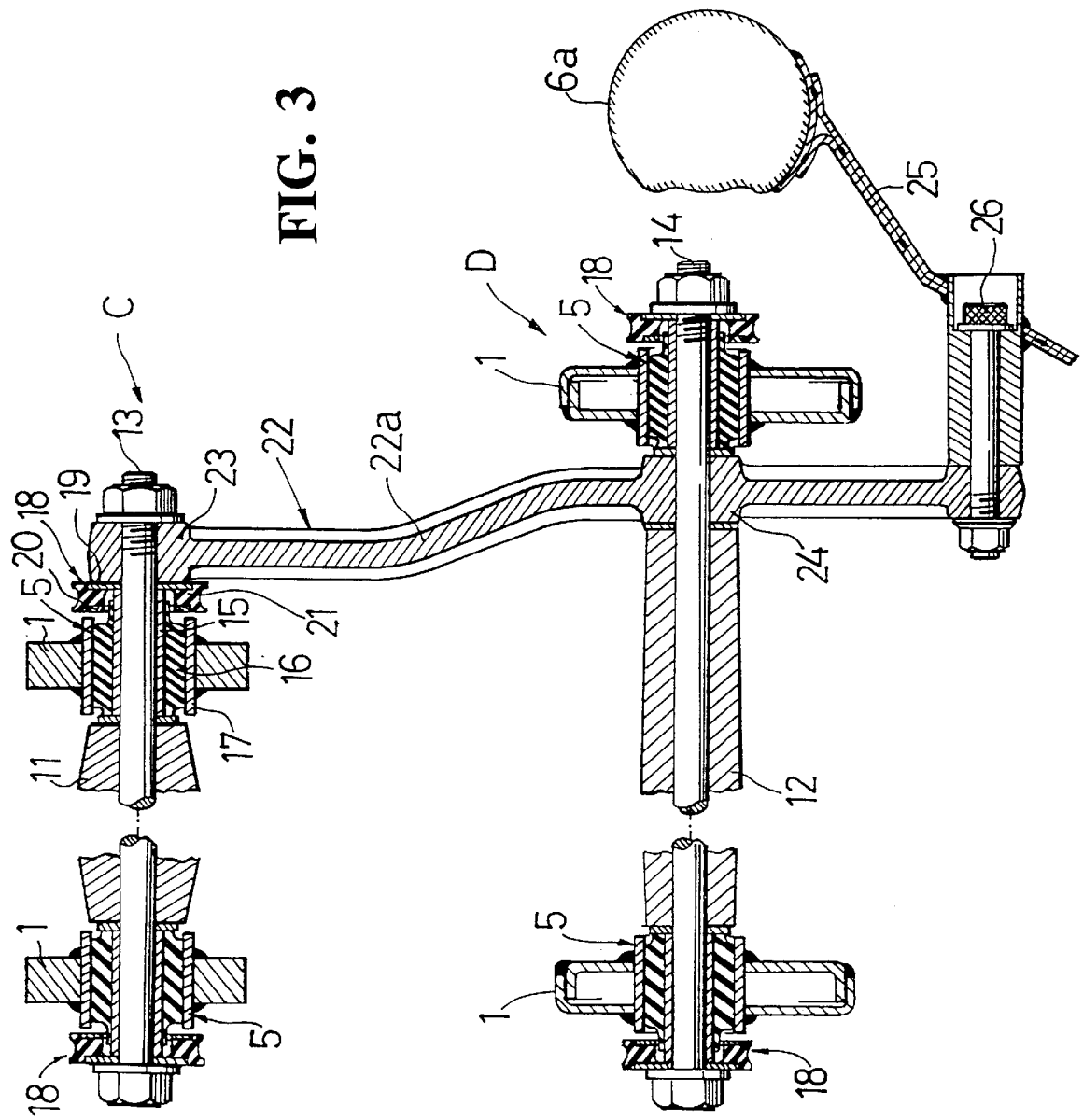
FIG. 3 is a sectional view taken along line 3—3 of FIG. 2.
Figure 4:
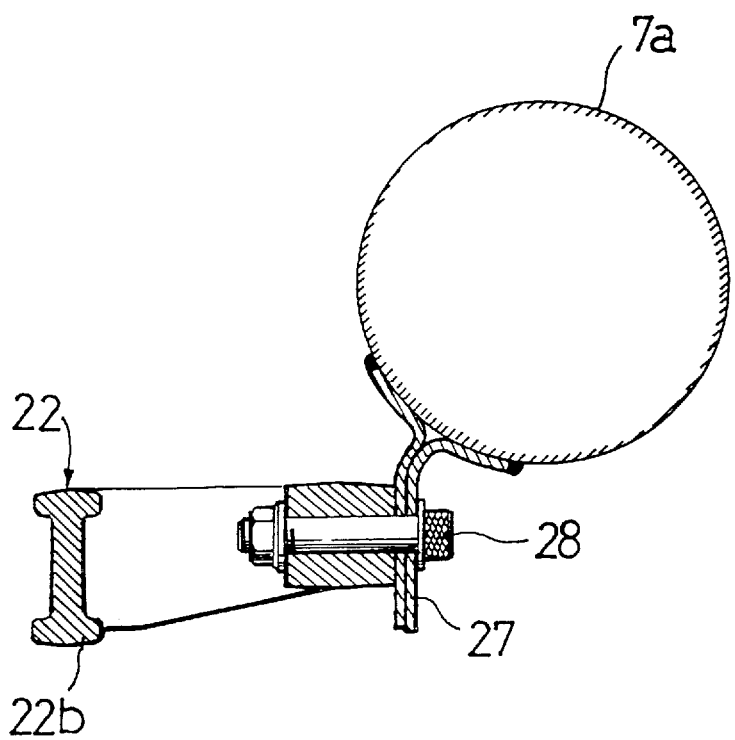
FIG. 4 is a sectional view taken along line 4—4 of FIG. 2.

Supporting structures of the two rear locations C and D of the power unit 4 are shown in FIGS. 2 and 3.

Referring to FIGS. 2 and 3, the power unit 4 has a pair of upper and lower mounting bosses 11 and 12 at rear portions thereof. A pair of hanger bolts 13 and 14 extend through and support the mounting bosses 11 and 12 and are supported at the left and right end portions thereof on the body frame 1 by way of resilient support members 5, 5. Each of the resilient support members 5 is constructed such that a resilient bushing 16 of rubber or the like baked on an outer periphery of an inner tube 15 is force fitted in an outer tube 17 concentrical with the inner tube 15. The outer tube 17 is securely mounted on the body frame 1 by soldering or the like while the inner tube 15 is securely mounted on the mounting boss 11 or 12 by way of a corresponding hanger bolt 13 or 14. Further, a resilient thrust member 18 is disposed on an outer end side of each of the resilient support members 5. The resilient thrust member 18 includes an outer side plate 19 and an inner side plate 20 opposed to each other in an axial direction and a resilient member 21 of rubber or the like coupling the outer side plate 19 and the inner side plate 20 to each other. The outer side plate 19 is secured to an outer end of the corresponding inner tube 15 on the corresponding hanger bolt 13 or 14 while the inner side plate 20 is disposed in an opposing relationship to the outer side plate 19 at an outer end of the outer tube 17 with a small gap left therebetween.

Then, making use of the hanger bolts 13 and 14, a bracket 22 for supporting the exhaust pipes 6a and 6b is fixed to the power unit 4, that is, the mounting bosses 11 and 12, in the following manner.

The bracket 22 is formed in an L-shaped configuration having a vertical portion 22a and a horizontal portion 22b extending rearwardly of the vehicle from a lower end of the vertical portion 22a. A pair of upper and lower bosses 23 and 24 are provided on the vertical portion 22a. The upper boss 23 is securely mounted on the hanger bolt 13 on the outer side plate 19 side of the resilient thrust member 18 on one side of the supporting portion C. The lower boss 24 is securely mounted on the hanger bolt 14 between the mounting boss 12 and the resilient support member 5 on the same side of the supporting portion D.

At a front portion of the horizontal portion 22b of the bracket 22 securely mounted on the power unit 4 in this manner, a front mounting arm 25 projects from the outer peripheral face of the exhaust pipe 6a and is fixed by means of a bolt 26. Further, at a rear portion of the horizontal portion 22b, a rear mounting arm 27 projects from the outer peripheral face of the muffler 7a and is fixed by means of a bolt 28 (see FIG. 4).

Furthermore, an intermediate portion of the horizontal portion 22b is connected to the body frame 1 by way of a pulse bar 30 having an upper end directed toward a main seat 29 provided at an upper portion of the body frame 1.

Figure 5:
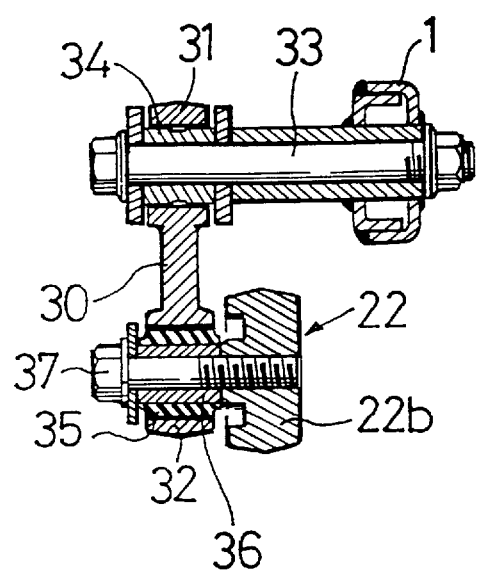
FIG. 5 is a sectional view taken along line 5—5 of FIG. 2.

As shown in FIG. 5, a pair of bosses 31 and 32 are formed at the opposite upper and lower ends of the pulse bar 30, and the upper boss 31 is supported for rotation on a metal bushing 34 securely mounted on the body frame 1 by means of a bolt 33. Meanwhile, a resilient bushing 35 of rubber or the like is force fitted in the lower boss 32, and a collar 36 baked to an inner circumferential face of the resilient bushing 35 is fixed to the horizontal portion 22b by means of a bolt 37.

It is to be noted that a fuel tank 38, a rear fork 39, and a rear wheel 40 are shown in FIG. 1.

Subsequently, operation of the present embodiment will be described.

Vibrations produced from the engine 2 when the engine 2 operates are transmitted not only to the entire power unit 4 but also to the exhaust pipes 6a and 6b extending from the engine 2, and to the muffler 7a and 7b of the exhaust pipes 6a and 6b.

The power unit 4 is supported on the body frame 1 by way of the resilient support members 5 together with the bracket 22 and the exhaust pipes 6a and 6b connected to the mufflers 7a and 7b, respectively, which are fixed to the bracket 22 by way of the front and rear mounting arms 25 and 27. Thus, vibrations of the power unit 4, the exhaust pipes 6a and 6b and the muffler 7a and 7b are all absorbed by deformation of the resilient bushings of the resilient support members 5. Transmission of these vibrations to the body frame 1 is suppressed. In this manner, the resilient support members 5 for the power unit 4 serve also as resilient support members for the system of the exhaust pipes 6a and 6b.

The pulse bar 30 connected at the upper end thereof to the body frame 1 is connected at a lower end portion thereof to the bracket 22 by way of the resilient bushing 35. Thus, high frequency vibrations of small amplitudes transmitted from the exhaust pipe 6a to the bracket 22 are absorbed effectively by deformation of the resilient bushing 35. However, most of low frequency vibrations of large amplitudes cannot be absorbed by deformation of the resilient bushing 35, but are transmitted to the pulse bar 30. Since the upper end of the pulse bar 30 is directed toward the main seat 29, the low frequency vibrations are transmitted from the pulse bar 30 to the main seat 29 by way of the body frame 1. Consequently, an agreeable pulsation feeling of the engine can be provided to the driver.

Figure 6:
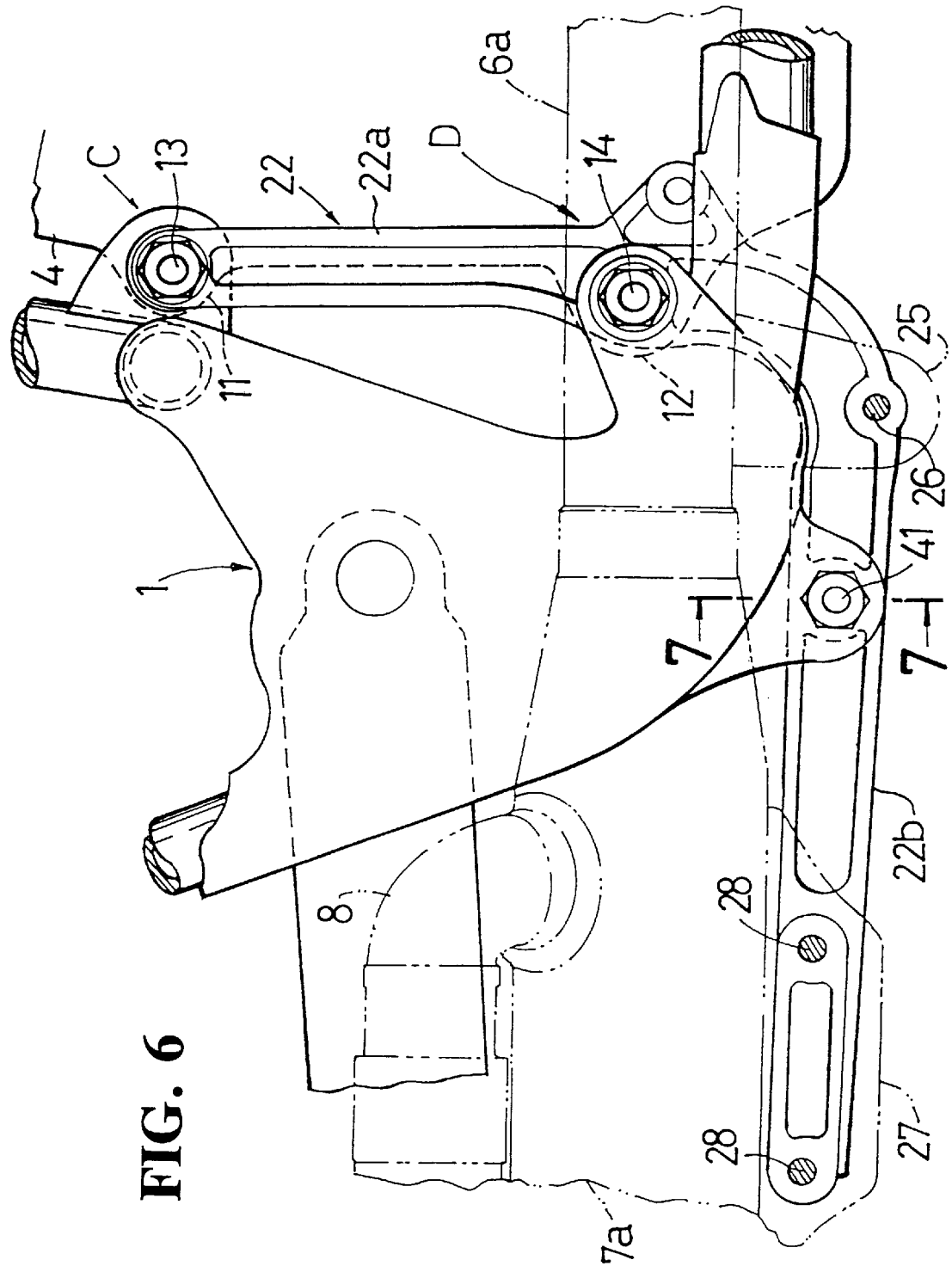
FIG. 6 is a side elevational view corresponding to FIG. 2 but showing a second embodiment of the present invention.
Figure 7:
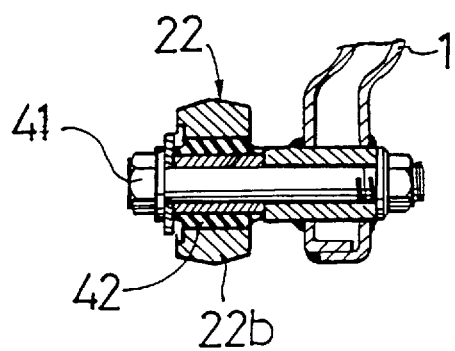
FIG. 7 is a sectional view taken along line 7—7 of FIG. 6.

FIGS. 6 and 7 show a second embodiment of the present invention. The second embodiment has a similar construction to that of the preceding embodiment except for the horizontal portion 22b of the bracket 22 being supported, just below the main seat 29, by way of a resilient bushing 42 and a bolt 41 fixed to the body frame 1 while the pulse bar 30 is omitted. In FIGS. 6 and 7, like elements to those of the preceding embodiment are denoted by like reference numerals. Also in the present embodiment, a pulsation feeling of the engine 2 can be transmitted to the main seat 29 side by way of the resilient bushing 42.

The embodiments described above can be modified in various manners without departing from the scope of the present invention. For example, the bracket 22 can be fixed to the power unit 4 by some other fixing means than the hanger bolts 13 and 14.

As described in the foregoing, according to the present invention, a supporting structure for an exhaust pipe system of a vehicle is provided wherein a power unit having an engine and a transmission is supported on a body frame by way of a resilient support member. The supporting structure is constructed such that an exhaust pipe system extending from the engine is supported on a bracket fixed to the power unit so that vibrations of the exhaust pipe system are absorbed by the resilient support member for the power unit. A resilient support member for exclusive use by the exhaust pipe system is not required and the supporting structure is inexpensive. Since the resilient support member is common to the power unit and the exhaust pipe system, no difference is produced between the vibration absorption characteristics of the power unit and the exhaust pipe system. Thus, excessive bending stress produced in the exhaust pipe system can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle including an exhaust pipe system and supporting structure for supporting said exhaust pipe system, said vehicle including a power unit having an engine and a transmission supported on a body frame by a resilient support member, said exhaust pipe system extending from said engine, said supporting structure comprising:

a bracket fixed to said power unit and extending therefrom, said bracket comprising a substantially L-shaped member having a substantially vertical leg portion and a substantially horizontal leg portion;

means for supporting said exhaust pipe system relative to said bracket; and hanger bolts for connecting said power unit to said body frame, wherein said substantially vertical leg portion is attached to said hanger bolts, and said exhaust pipe system is attached to said substantially horizontal leg portion.

2. The vehicle according to claim 1, and further comprising a pulse bar connected between said substantially horizontal leg portion and said body frame.

3. A vehicle including an exhaust pipe system and supporting structure for supporting said exhaust pipe system, said vehicle including a frame, and a power unit attached to said frame and said exhaust pipe system, said supporting structure comprising:

a bracket for attachment to said power unit and extending therefrom, said bracket including a first portion attached to said power unit and a second portion extending from said first portion;

means for supporting said exhaust pipe system relative to at least one of said first and second portions of said bracket; and a pulse bar connected between said second portion of said bracket and said frame.

4. The vehicle according to claim 3, wherein said pulse bar comprises an elongate member having an upper end and a lower end, said lower end including a resilient bushing, wherein said upper end of said pulse bar is connected to said frame, and wherein said second portion of said bracket is attached to said lower end of said pulse bar through said resilient bushing.

5. The vehicle according to claim 4, wherein said first and second portions of said bracket form a substantially L-shaped member having a substantially vertical leg portion and a substantially horizontal leg portion, said vertical leg portion being adapted to be attached to said power unit, and said exhaust pipe system being adapted to be attached to said horizontal leg portion.

6. A vehicle including an exhaust pipe system and supporting structure for supporting said exhaust pipe system, said vehicle including a frame, and a power unit attached to said frame and said exhaust pipe system, said supporting structure comprising:

a bracket for attachment to said power unit and extending therefrom, said bracket including a first portion attached to said power unit and a second portion extending from said first portion; and means for supporting said exhaust pipe system relative to at least one of said first and second portions of said bracket, wherein said second portion of said bracket comprises a forwardmost portion and a rearwardmost portion, and wherein said exhaust pipe system comprises at least a first exhaust pipe and a second exhaust pipe, said first exhaust pipe being attached to said forwardmost portion and said second exhaust pipe being attached to said rearwardmost portion.

7. The vehicle according to claim 6, wherein said first portion comprises a substantially vertical leg portion, and said second portion comprises a substantially horizontal leg portion, whereby said substantially vertical leg portion and said substantially horizontal leg portion form a substantially L-shaped member.

8. The vehicle according to claim 7, wherein said power unit comprises an upper mounting boss and a lower mounting boss, first attaching means for attaching said upper mounting boss to said frame, and second attaching means for attaching said lower mounting boss to said frame, said first attaching means being attached to an upper portion of said substantially vertical leg portion of said bracket, and said second attaching means being attached to a lower portion of said substantially vertical leg portion of said bracket.

9. The vehicle according to claim 8, wherein said first attaching means comprises first and second resilient members, said upper mounting boss being located between said first resilient member and said second resilient member, said upper portion of said bracket being attached adjacent to said second resilient member.

10. A vehicle including an exhaust pipe system and supporting structure for supporting said exhaust pipe system, said vehicle including a frame, and a power unit attached to said frame and said exhaust pipe system, said supporting structure comprising:

a bracket for attachment to said power unit and extending therefrom, said bracket including a first portion attached to said power unit and a second portion extending from said first portion; and means for supporting said exhaust pipe system relative to at least one of said first and second portions of said bracket, wherein said power unit comprises an upper mounting boss and a lower mounting boss, first attaching means for attaching said upper mounting boss to said frame, and second attaching means for attaching said lower mounting boss to said frame, said first attaching means being attached to a first portion of said bracket, and said second attaching means being attached to a second portion of said bracket.

11. The vehicle according to claim 10, wherein said first attaching means comprises first and second resilient members, said upper mounting boss being located between said first resilient member and said second resilient member, said first portion of said bracket being attached adjacent to said second resilient member.

12. A vehicle including an exhaust pipe system and supporting structure for supporting said exhaust pipe system, said vehicle having a frame, a power unit attached to said frame, with said exhaust pipe system being attached to said power unit, said supporting structure comprising:

a bracket fixed to said power unit for supporting said exhaust pipe system, said bracket comprising a first portion attached to said power unit and a second portion attached to said exhaust pipe system, said first portion being a substantially vertical leg portion, and said second portion being a substantially horizontal leg portion, said substantially vertical leg portion and said substantially horizontal leg portion forming a substantially L-shaped member, a pulse bar connected between said substantially horizontal leg portion and said frame, said pulse bar comprising an elongate member having an upper end and a lower end, said lower end of said pulse bar including a resilient bushing, said upper end of said pulse bar being connected to said frame, said substantially horizontal leg portion being attached to said lower end of said pulse bar through said resilient bushing.

13. The vehicle according to claim 12, said substantially horizontal leg portion further comprising a forwardmost portion and a rearwardmost portion, said exhaust pipe system comprising at least a first exhaust pipe and a second exhaust pipe, said first exhaust pipe being attached to said forwardmost portion and said second exhaust pipe being attached to said rearwardmost portion.

14. The vehicle according to claim 13, wherein said power unit comprises an upper mounting boss and a lower mounting boss, first attaching means for attaching said upper mounting boss to said frame, and second attaching means for attaching said lower mounting boss to said frame, said first attaching means being attached to an upper portion of said substantially vertical leg portion of said bracket, and said second attaching means being attached to a lower portion of said substantially vertical leg portion of said bracket.

15. The vehicle according to claim 14, wherein said first attaching means comprises first and second resilient members, said upper mounting boss being located between said first resilient member and said second resilient member, said upper portion of said bracket being attached adjacent to said second resilient member.

16. The vehicle according to claim 12, wherein said vehicle comprises a motorcycle having a front ground engaging wheel and a rear ground engaging wheel.

17. The vehicle according to claim 12, wherein said pulse bar is connected to approximately an intermediate portion of said substantially horizontal leg portion.

18. A vehicle including an exhaust pipe system and supporting structure for supporting said exhaust pipe system, said vehicle including a power unit having an engine and a transmission supported on a body frame by a resilient support member, said exhaust pipe system extending from said engine, said supporting structure comprising:

a bracket fixed to said power unit and extending therefrom, said bracket comprising a substantially L-shaped member having a substantially vertical leg portion and a substantially horizontal leg portion; and means for supporting said exhaust pipe system relative to said bracket, whereby said supporting structure produces a rigid connection between said exhaust pipe system and said power unit wherein said substantially horizontal leg portion of said bracket comprises a forwardmost portion and a rearwardmost portion, and wherein said exhaust pipe system comprises at least a first exhaust pipe and a second exhaust pipe, said first exhaust pipe being attached to said forwardmost portion and said second exhaust pipe being attached to said rearwardmost portion.

19. A vehicle including an exhaust pipe system and supporting structure for supporting said exhaust pipe system, said vehicle including a power unit having an engine and a transmission supported on a body frame by a resilient support member, said exhaust pipe system extending from said engine, said supporting structure comprising:

a bracket fixed to said power unit and extending therefrom, said bracket comprising a substantially L-shaped member having a substantially vertical leg portion and a substantially horizontal leg portion; and means for supporting said exhaust pipe system relative to said bracket, whereby said supporting structure produces a rigid connection between said exhaust pipe system and said power unit wherein said power unit comprises an upper mounting boss and a lower mounting boss, first attaching means for attaching said upper mounting boss to said frame, and second attaching means for attaching said lower mounting boss to said frame, said first attaching means being attached to an upper portion of said substantially vertical leg portion of said bracket, and said second attaching means being attached to a lower portion of said substantially vertical leg portion of said bracket.

* * * * *